B. WOLHAUPTER & L. F. BRAINE.
INSULATED RAIL JOINT.
APPLICATION FILED NOV. 6, 1908.

937,499.

Patented Oct. 19, 1909.
6 SHEETS—SHEET 1.

INVENTORS
Lawrence F. Braine
and Benjamin Wolhaupter.
Attorney

B. WOLHAUPTER & L. F. BRAINE.
INSULATED RAIL JOINT.
APPLICATION FILED NOV. 6, 1908.

937,499.

Patented Oct. 19, 1909.
6 SHEETS—SHEET 4.

WITNESSES:

INVENTORS
Lawrence F. Braine
and Benjamin Wolhaupter.
BY
B. Wolhaupter
Attorney

B. WOLHAUPTER & L. F. BRAINE.
INSULATED RAIL JOINT.
APPLICATION FILED NOV. 6, 1908.

937,499.

Patented Oct. 19, 1909.
6 SHEETS—SHEET 6.

WITNESSES:
Wm F Hoyle
Emory L Groff.

INVENTORS
Laurence F. Braine
and Benjamin Wolhaupter.
By B. Wolhaupter
Attorney

UNITED STATES PATENT OFFICE.

BENJAMIN WOLHAUPTER AND LAWRENCE F. BRAINE, OF NEW YORK, N. Y., ASSIGNORS TO THE RAIL JOINT COMPANY, OF NEW YORK, N. Y., A CORPORATION OF NEW YORK.

INSULATED RAIL-JOINT.

937,499.  Specification of Letters Patent.  Patented Oct. 19, 1909.

Application filed November 6, 1908. Serial No. 461,405.

*To all whom it may concern:*

Be it known that we, BENJAMIN WOL-HAUPTER and LAWRENCE F. BRAINE, citizens of the United States, both residing at New York city, in the county of New York and State of New York, have invented certain new and useful Improvements in Insulated Rail-Joints, of which the following is a specification.
This invention relates to rail joints of the insulated type, and has special reference to a novel and practical joint of this character comprising means for providing a solid metallic bearing support at the under sides of the rail heads, and also maintaining a complete and effective insulation for the joint.

As a general object, the invention has in view a construction wherein no insulation is interposed between the heads of the rails and the metallic bars next to the same. This admits of the heads of the rails taking a solid and direct bearing on the joint bars, while also permitting of such a disposition of the insulating material as to relieve the same from the pressure of the load without detracting at all from the efficiency of the insulation. In other words, the invention provides a structure in which a solid metallic bearing is secured for the rail heads, and a complete insulation of the joint is effected without the employment of any side or bottom insulation such as used in many forms of insulated rail joints. This latter object is fulfilled, in the present invention, by utilizing an enlarged or modified end post insulation, in connection with suitable bolt insulation, as the complete insulating means for the joint.

In carrying out the foregoing objects, the present invention contemplates the use of two-part joint bars at each side of the rails, that is, associating with each rail separate half-length joint bars, each of which half-length bars is coupled, by bolts or equivalent fastenings with the adjoining joint bar at the same side of the joint. In this connection, the chief and important feature of the present invention resides in providing what may be termed an interlocking brace connection between the coupling elements or members of the adjoining joint bars, or joint bar sections. This interlocking brace connection subserves the practical function of a bracing stay to brace and hold the coupled joint bar sections against relative vertical displacement, and hence relieving the fastening or coupling bolts from the resultant shearing action which would be due to such displacement. Also, the interlocking brace connection serves to additionally reinforce and stiffen the joint at the center thereof in the vertical plane of the joint between the meeting ends of the rails.

A general object of the invention is to provide a strong, thoroughly practical, and effectually insulated, design of rail joint capable of application to different traffic requirements and to different rail sections, but in all instances, subserving the functions indicated above.

With these and other objects in view, which will readily appear to those familar with the art as the nature of the invention is better understood, the same consists in the novel construction, combination, and arrangement of parts hereinafter more fully described, illustrated and claimed.

The essential feature of the invention involved in the interlocking brace connection between the coupling flanges of adjacent joint bar sections, is necessarily susceptible to a wide range of structural modification, and to embodiment in different forms of brace or stay connections without departing from the scope of the invention, but certain preferred embodiments of the invention are suggested in the accompanying drawings, in which:

Like references designate corresponding parts in the several figures of the drawings.

A rail joint constructed according to the design and plan of the present invention embodies in its organization the service rails R, the side joint bars 1, and the usual series of track bolts 2. In the present invention, these track bolts do not require the usual bolt insulation, inasmuch as the complete insulation of the joint is provided for at the center thereof in the manner hereinafter fully explained.

The improvement specially claimed herein, namely, that of the interlocking brace connection between the coupling members of adjoining joint bars, is of practical importance in connection with two-part joint bars at each side of the rails. As shown in the drawings, these bars may be termed "discontinuous", that is, terminating at or near the meeting ends of the rails, instead of extending continuously throughout the joint as do the ordinary angle bars or splice bars commonly employed in rail joint structures both of the standard and insulated types. Hence, in the structure shown in the drawings, there are separate joint bar sections for each rail, the same being arranged respectively upon opposite sides of the rails. As indicated, the separate joint bar sections for each rail are of lengths approximately equaling one-half the length of the joint so as to terminate at or near the joint between the meeting ends of the rails, and these joint bar sections may be of any conventional or approved design, but are preferably of the rail chair formation shown. Thus, in the illustrated embodiment of the invention, each joint bar section consists of the main upright bar portion 3 formed at its upper edge with the usual bearing head 4 having a direct metallic bearing against the under side of the rail head. At its lower edge the upright portion 3 of each angle bar has formed integrally therewith an outturned foot flange 5 overlying the rail flange and having formed integrally with the outer edge portion the horizontal inwardly extending rail supporting base section 6 extending beneath and supporting the rail bottoms. Also, each joint bar section is preferably provided at the inner edge of its base section 6 with an integral pendent stiffening flange or girder 7, of any desired projection below the base section and usually flaring in width toward the inner end of the joint bar section so as to have its greatest width or projection at the center of the joint.

In addition to the rail chair and girder formation, above referred to, of the joint bar sections, each of the latter is provided at what may be termed its inner end (that is, the end next to the joint between the meeting ends of the rails) with an integral or rigid coupling flange 8. This coupling flange is an offstanding outturned flange disposed at approximately right angles to the longitudinal plane of the joint bar section, and is of such an extent as to provide a substantial and broad coupling for the adjoining bar sections, while at the same time materially reinforcing and stiffening the joint bars at the center of the joint. It will be observed that the individual coupling flanges 8 of the separate joint bar sections are arranged vertically, and are also disposed transversely with respect to the longitudinal plane of the joint. Furthermore, besides being offset directly from the vertical portions of the joint bars, the coupling flanges 8 are continued downwardly to form depending girder sections 9 projecting a material distance below the plane of the rail bottoms and also having inner girder extensions 10 lying beneath and joining the rail supporting base-sections 6, thereby combining with the longitudinally arranged flanges or girders 7 to effectually stiffen and reinforce the joint bars so that the latter will be of a maximum strength at the center of the joint.

Figure 2:
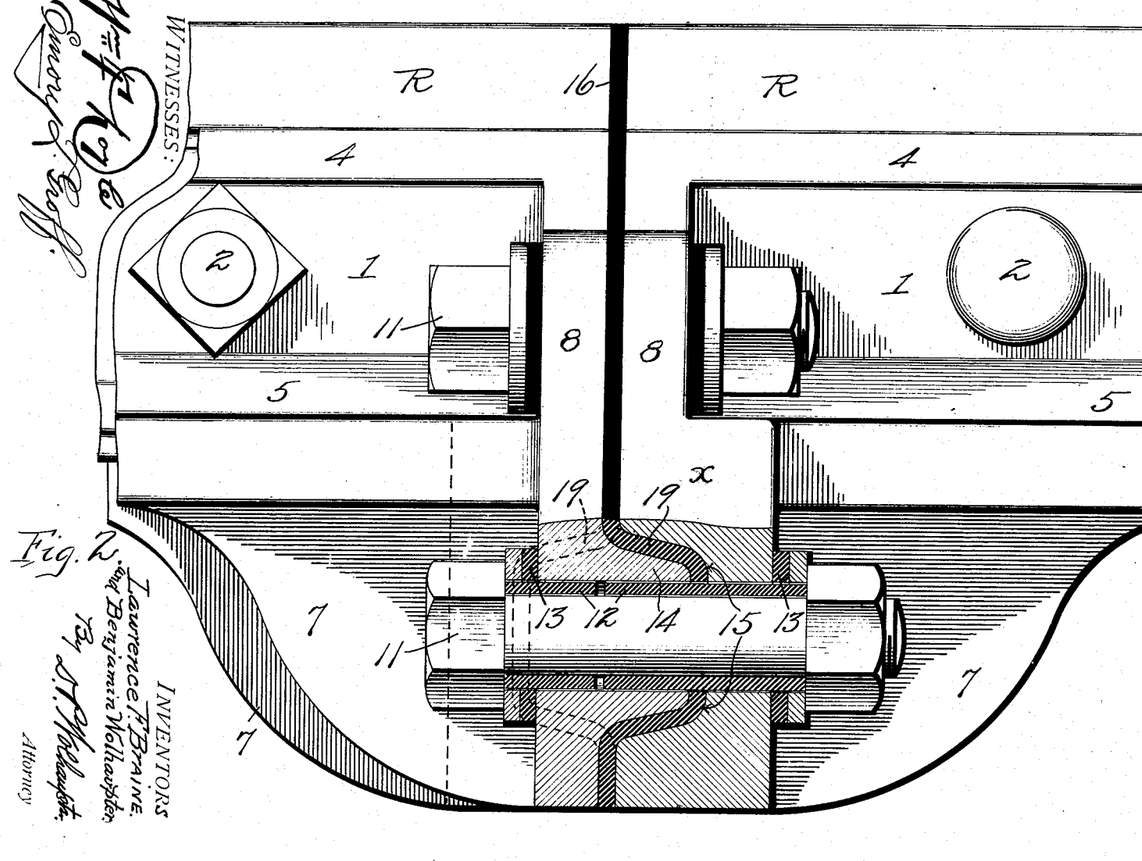
Fig. 2 is a side elevation of the joint, a portion of the coupling flanges of adjoining joint bar sections being broken away on the section line 2—2 of Fig. 3 to expose the interlocking and bolt connection.

The offstanding coupling flanges 8 of the adjoining joint bar sections, at the same side of the joint, are arranged in opposing parallel relation, and are adapted to be rigidly fastened together through the medium of a plurality of horizontally arranged fastening bolts 11. Any desired number of the fastening bolts may be utilized to provide the rigid, though separable, coupling connection between the adjoining joint bar sections at the same side of the joint. In carrying out the invention, the said fastening bolts are designed to be equipped with suitable bolt insulation so as to thoroughly insulate the shanks, heads, and nuts of the bolts from the coupling flanges 8 with which they are associated. Any approved bolt insulation may be employed for the purpose, such for instance as the bolt insulating sleeves or bushings 12 lining the bolt holes through which the bolts extend, and the insulating washers 13 interposed between the heads and nuts of the bolts, and the opposing metallic faces of the coupling flanges, all of which plainly appears in the illustration of Fig. 2 of the drawings.

As herein pointed out, a distinctive and important feature of this invention resides in providing what has been termed an interlocking brace connection between the opposing coupled flanges 8 of the adjoining joint bar sections. This interlocking brace connection may be effected in a variety of ways to carry out the function of a bracing stay to brace and hold the coupled joint bar sections against relative vertical displacement, and hence take the shearing action off of the fastening bolts 11. However, for illustrative purposes, practical embodiments of this brace connection are suggested in the drawings, and referring to the form shown in the principal figures therein, it will be observed that this brace connection may consist of a stay piece 14 projected from one coupling flange 8, and a stay seat 15 formed in or on the opposing coupling flange. In this embodiment of the invention, the stay piece 14 is illustrated as being in the form of an offstanding rib, tongue, or tenon projecting from one face of the coupling flange carrying the same, and extending horizontally and transversely across the depending girder section 9 of said flange below the plane of the rail supporting base sections, while the complemental stay seat 15 in the opposing coupling flange 8 of the adjoining joint bar section, is correspondingly arranged in or on said latter flange. The said stay seat 15 is in effect the complemental female part of the brace connection, and in the design being described, is in the form of a recess, groove, or mortise receiving the said stay piece 14 and necessarily presenting shoulders opposing and co-acting with said stay piece so that the matching and interlocked elements necessarily provide a bracing stay to hold and secure the coupled flanges, and hence the coupled joint bar sections, against relative vertical displacement at the center of the joint.

Figure 1:
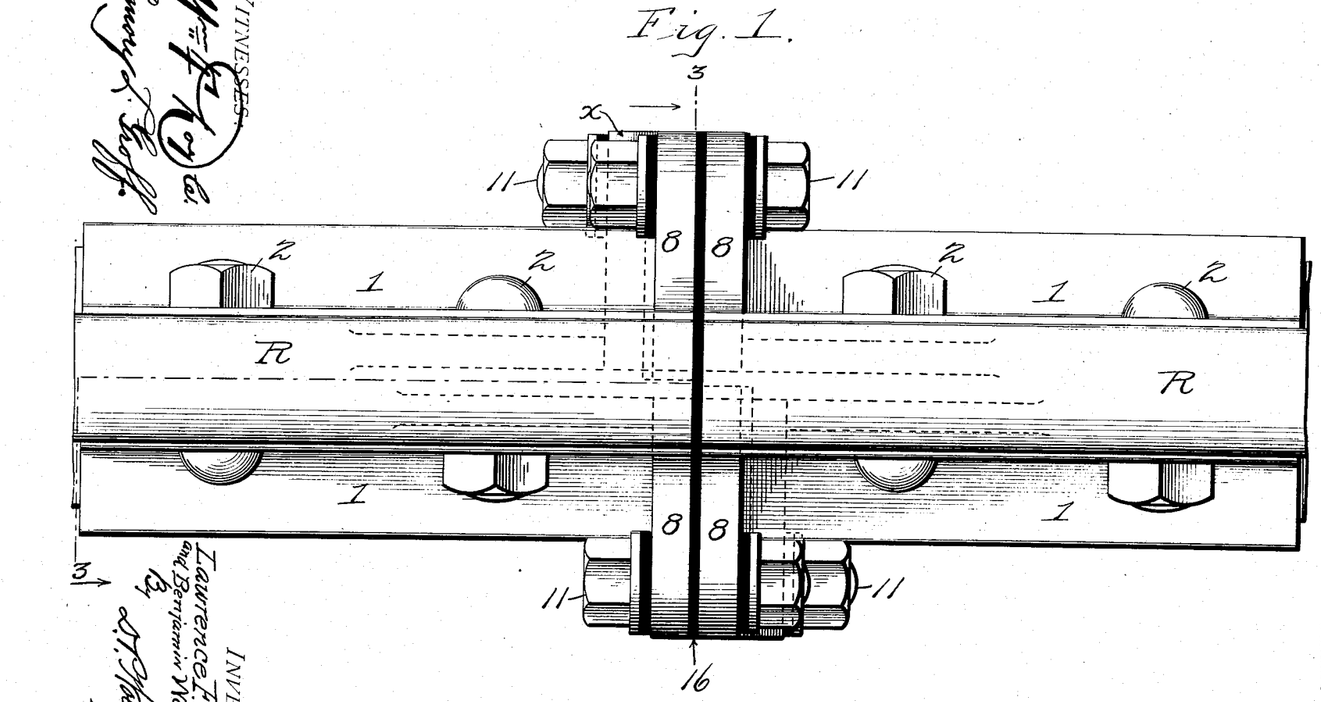
Figure 1 is a top plan view, of an insulated rail joint embodying the improvement contemplated by the present invention.

In the construction above described, it is preferable to thicken, as at $x$, that coupling flange having the stay seat 15 formed therein in order to compensate for the space occupied by such seat, thereby maintaining the full strength of such flange. Also, in the construction shown, the parts or elements of the interlocking brace connection are reversed on opposite sides of the joint so that the recessed coupling flanges, at opposite sides of the joint, occupy a diagonally opposite relation, as shown by the dotted lines in Fig. 1 of the drawings. This arrangement saves in the number of patterns and parts of joints required in the manufacture of the same, but it will of course be understood that the joints may be constructed without this diagonal arrangement referred to.

Figures 4, 5:
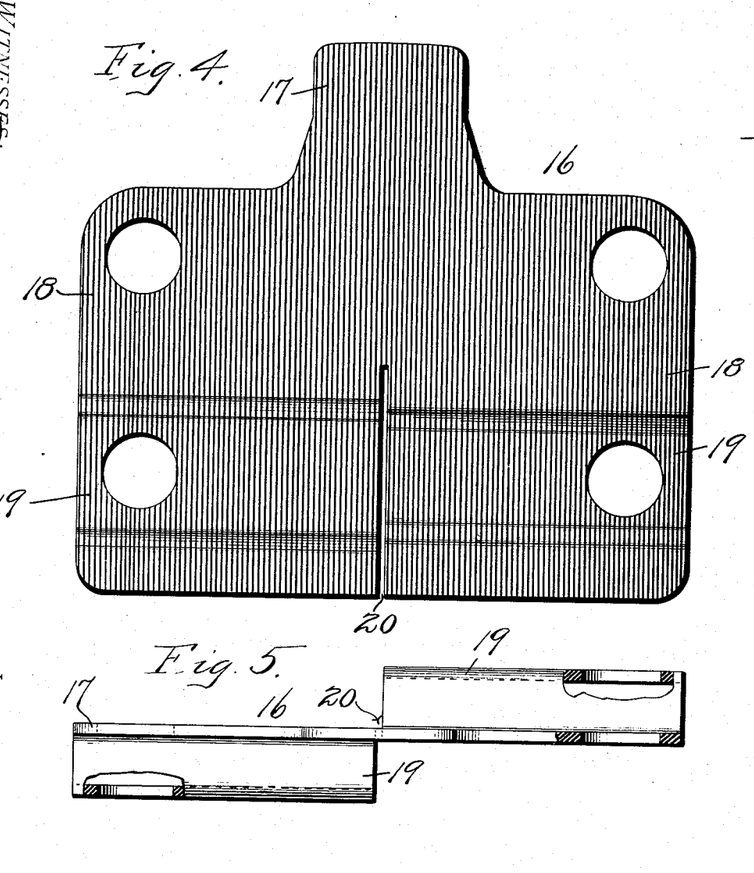
Fig. 4 is a plan elevation of the specially designed insulating end post.
Fig. 5 is a top plan view of the end post showing the oppositely deflected or offset portions to adapt the same to the diagonally opposite interlocking brace connections at opposite sides of the joint.

Besides the bolt insulation for the fastening bolts 11, there is also employed a specially designed insulating end post 16, which serves to entirely complete the insulation between the rail ends and also between the contiguous ends of the separate joint bar sections, and between the coupling flanges of the latter. With this arrangement of the insulation, the same is subjected to little or no fiber strain, besides admitting of the use of a minimum amount of insulation for the joint. The said insulating end post 16 is made of any suitable insulating material or fiber such as commonly employed in insulated rail joint structures, and in adapting the same to the form of the invention already described, it will be observed that the said end post consists of a sheet or blank of insulating material having a configuration conforming to that of the rail ends, and also to that of the contiguous ends of the separate joint bar sections, and to that of the coupling flanges 8 thereof. This is plainly shown in Fig. 4 of the drawings, wherein the sheet of insulation forming the end post is designated by the number 17 and is provided with the laterally extended side wings or aprons 18 which are of a shape and extent so as to entirely occupy the interval between the opposing coupling flanges 8 of the separate joint bar sections.

Figure 3:
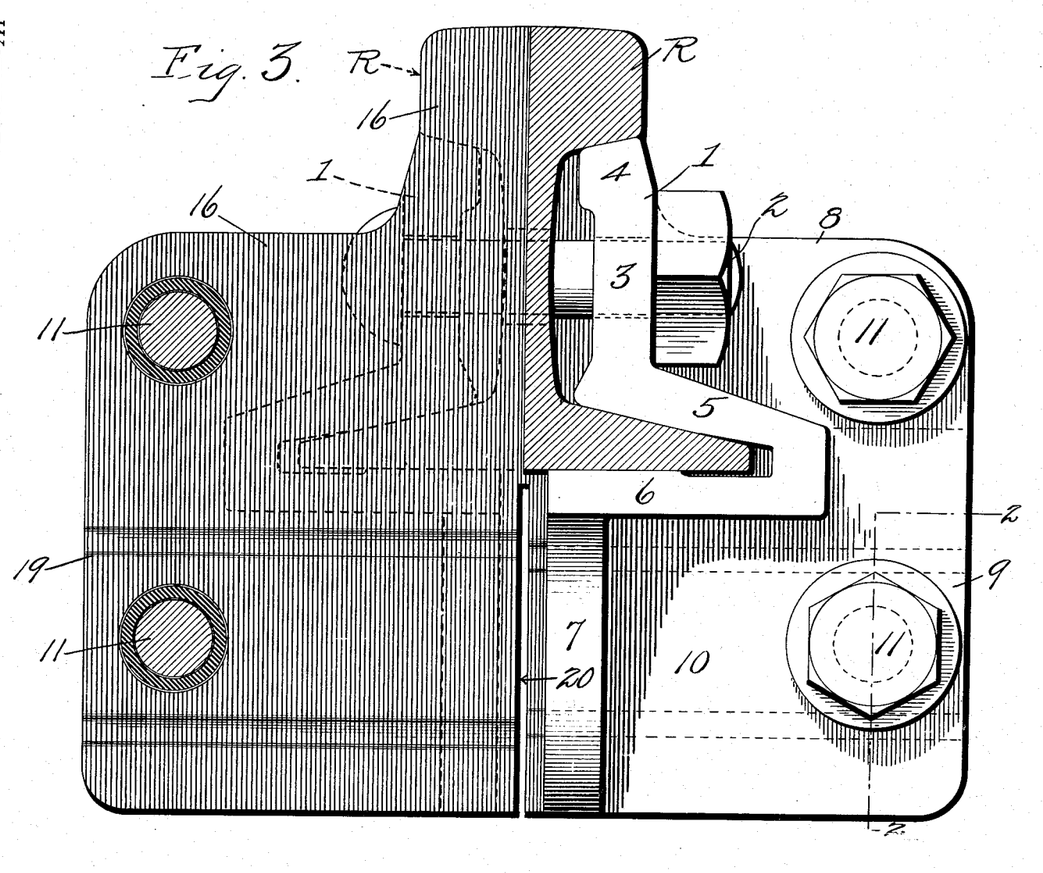
Fig. 3 is a zig-zagged sectional view on the line 3—3 of Fig. 1, which view omits the joint bar section at one side of one of the rail ends.
Figure 6:
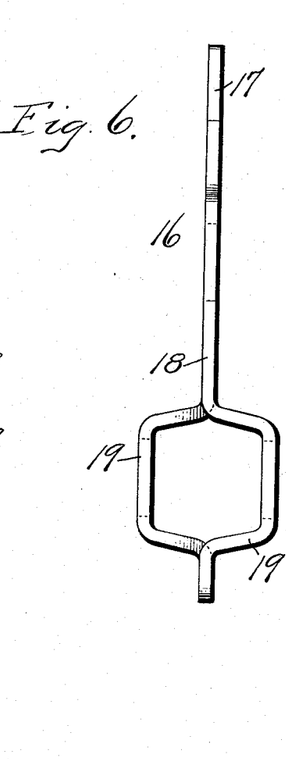
Fig. 6 is an edge view of the specially designed insulating end post.

Another feature of the insulating end post 16 is that of shaping the opposite side portions or wings 18 thereof to form transversely arranged cupped sections 19 conforming to the shape of, and fitting the interlocking stay pieces and seats 14 and 15. Where the reversed arrangement of these elements 14 and 15 is used in diagonally opposite relation, at opposite sides of the joint, the separate cupped sections 19 of the end post sheet, are respectively deflected in opposite directions, as plainly shown in Figs. 5 and 6, and to admit of this, the sheet of insulation is provided with a centrally arranged and vertically disposed slit 20 extending upward from the bottom edge to a point beneath the rails, as may be best seen in Figs. 3 and 4 of the drawings. Where there is no diagonally opposite arrangement, there is no need of slitting the insulation.

Figure 7:
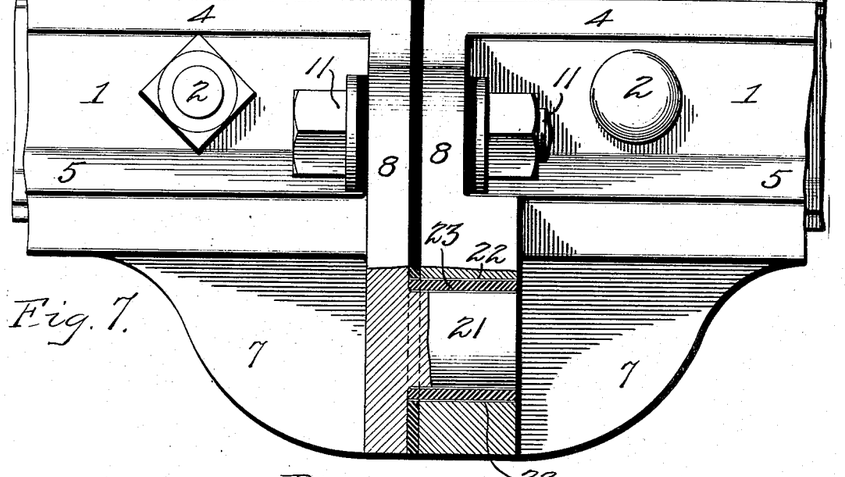
Fig. 7 is a view similar to Fig. 2 illustrating a modified form of interlocking brace connection that may be untilized in carrying out the invention.
Figure 8:
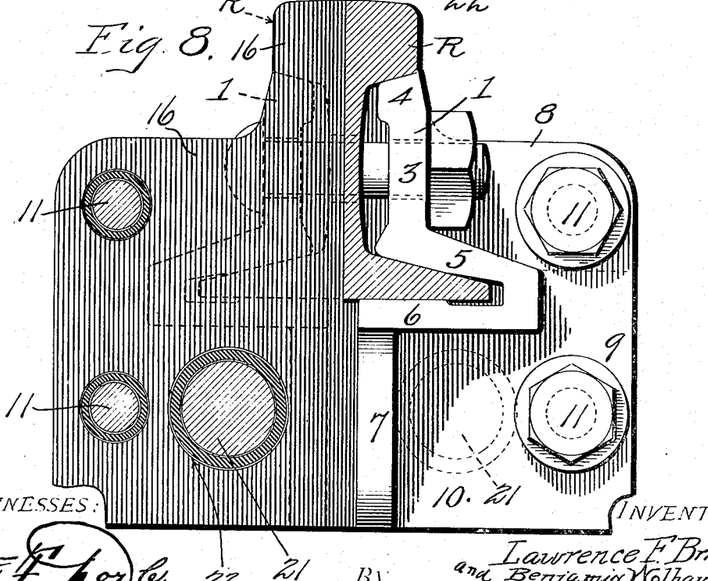
Fig. 8 is a sectional view (on the same line of section as Fig. 3) of the modified structure shown in Fig. 7.

As already indicated, the interlocking brace connection between adjoining joint bar sections may be effected in a variety of ways without departing from the invention, and by way of illustrating the range of modification that may be resorted to in providing the said interlocking brace connection, there is suggested in Figs. 7 and 8 of the drawings the idea of providing the coupling flange 8 of one joint bar section with a horizontally projecting stay element 21 in the form of a round or equivalent shaped tenon plug fitting in a complemental keeper hole 22 formed in the opposing coupling flange 8 of the adjoining bar section at the same side of the joint. This construction is duplicated at both sides of the joint as shown in Fig 8 of the drawings, and the tenon plugs 21 may be suitably insulated by surrounding the same with insulating sleeves or bushings 23. In other respects, the said modification shown in Figs. 7 and 8 is similar to, and performs all of the functions of, the form of construction shown in Figs. 1, 2 and 3 of the drawings. In connection with the modification, as illustrated in Figs. 7 and 8 of the drawings, it will be observed that it is unnecessary to slit the end post insulation which only requires the piercing thereof with suitable holes to receive the fastening bolts 11 and the tenon plugs 21.

Figure 9:
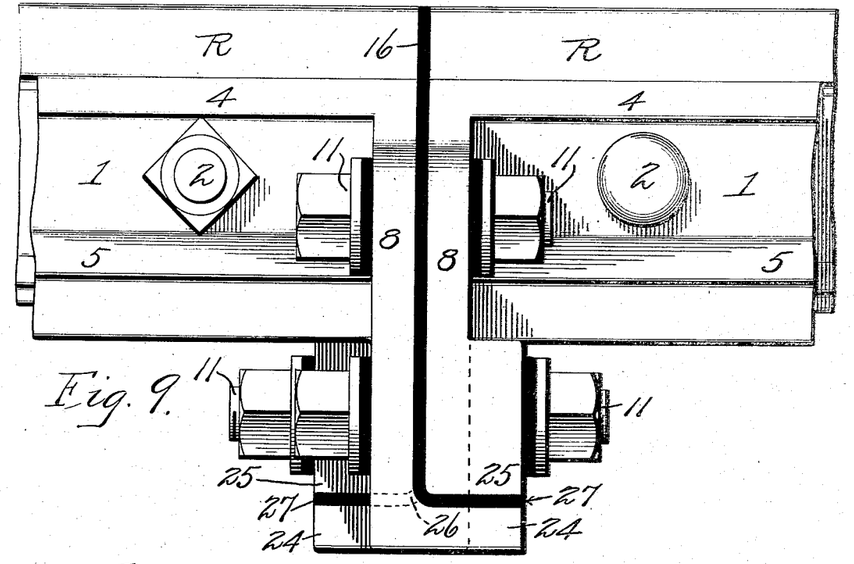
Fig. 9 is a side elevation illustrating another modification that may be resorted to in carrying out the invention.
Figure 10:
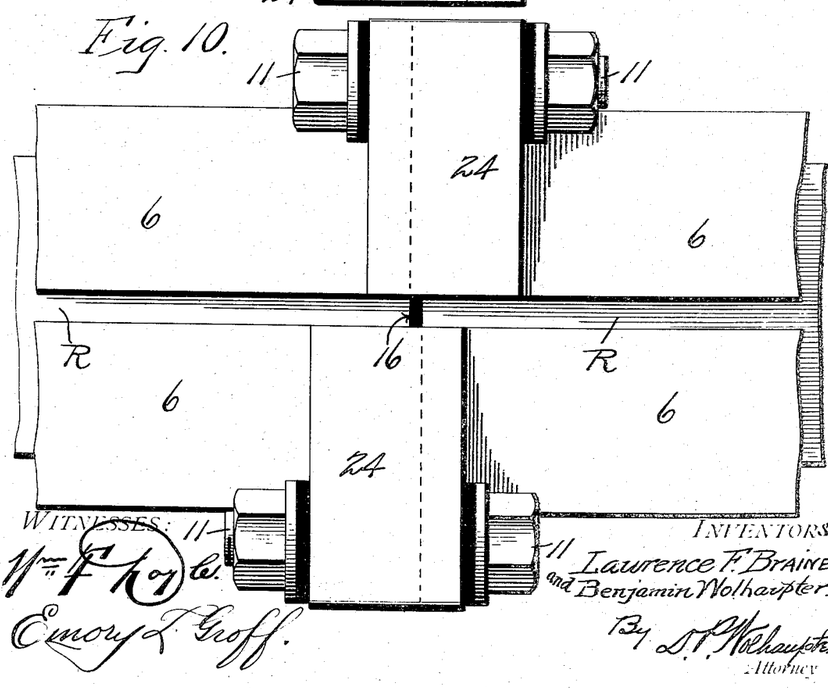
Fig. 10 is a bottom plan view of the form of construction suggested in Fig. 9.

To exemplify the wide range of modification that may be resorted to in carrying out the invention to provide a means for checking and resisting the tendency of the load to cause relative vertical displacement of the coupling flanges, there is shown in Figs. 9 and 10 an embodiment wherein the coupling flange 8 of one of the joint bar sections at each side of the joint is provided at its lower edge with a bracing element 24 in the form of an integral horizontally arranged stay flange which underlaps and lies in the vertical plane of the bottom edge portion 25 of the opposing coupling flange 8 of the adjoining bar section at the same side of the joint. In this construction, as shown in Figs. 9 and 10, the parts or elements of the brace connection 24—25 are reversed on opposite sides of the joint so that the opposite stay flanges 24 occupy a diagonally opposite relation, thereby providing the joint upon both sides thereof with means for bracing the coupled joint bar sections and hence preventing relative vertical displacement. In this form of the invention, it is necessary to slit the bottom edge portion of the end post insulation as indicated at 26 and deflect the insulation at opposite sides of the slit to provide the insulating flanges 27, interposed between the stay elements 24 and 25, at opposite sides of the joint, all of which plainly appears in Fig. 9 of the drawings.

Various other modifications involving different shapes for the stay elements, and divers arrangements thereof to hold the joint bar sections against vertical displacement may obviously be resorted to without departing from the spirit or sacrificing any of the advantages of the invention.

We claim:

1. In an insulated rail joint, the rails, separate joint bar sections for each rail, the adjoining bar sections having a bolted coupling and a brace connection supplementing the latter, said brace connection comprising means for preventing relative vertical displacement of the bolted parts, and insulating means.

2. In an insulated rail joint, the rails, separate joint bar sections for each rail, each of said joint bar sections having at its inner end a coupled interlocking connection with the contiguous end of the other adjoining bar section at the same side of the rails, said coupled interlocking connection comprising means for bracing the bar sections against relative vertical displacement, and insulating means.

3. In an insulated rail joint, the rails, separate joint bar sections for each rail, the adjoining bar sections having opposing coupling flanges, and bracing means between said flanges, separate fastenings connecting said flanges, and insulating means.

4. In an insulated rail joint, the rails, separate joint bar sections for each rail, each of said joint bar sections having a coupled interlocking connection with the other adjoining bar section, and insulating means.

5. In an insulated rail joint, the rails, separate joint bar sections for each rail having a direct metallic bearing against the under side of the rail head, each of said joint bar sections having a coupled interlocking connection with the other adjoining bar section, and insulating means.

6. In an insulated rail joint, the rails, separate joint bar sections for each rail, a coupling connection between the adjoining joint bar sections at each side of the joint, means for bracing the coupled sections against relative vertical displacement, and insulating means.

7. In an insulated rail joint, the rails, separate joint bar sections for each rail, the adjoining bar sections having a bolted coupling, and brace connections supplementing the latter, and insulating means.

8. In an insulated rail joint, the rails, separate joint bar sections for each rail, the adjoining bar sections having a bolted coupling and an interlocking brace connection supplementing the latter, and insulating means.

9. In an insulated rail joint, the rails, separate joint bar sections for each rail, the adjoining bar sections having a bolted coupling and an interlocking brace connection supplementing the latter and comprising means for preventing relative vertical displacement of the bolted parts, and insulating means.

10. In an insulated rail joint, the rails, separate joint bar sections for each rail, the adjoining bar sections having opposing coupling flanges and a brace connection between the latter, separate fastenings connecting said flanges, and insulating means.

11. In an insulated rail joint, the rails, separate joint bar sections for each rail, the adjoining bar sections having opposing coupling flanges and an interlocking brace connection between the latter, separate fastenings connecting said flanges, and insulating means.

12. In an insulated rail joint, the rails, separate joint bar sections for each rail, the adjoining bar sections having opposing coupling flanges and a brace connection comprising shouldered interlocking stay elements carried respectively by the separate flanges, fastenings connecting said flanges, and insulating means.

13. In an insulated rail joint, the rails, separate joint bar sections for each rail, the adjoining bar sections having opposing coupling flanges respectively provided with a stay projection and a stay seat having an interlocking relation, fastenings connecting said flanges, and insulating means.

14. In an insulated rail joint, the rails, separate joint bar sections for each rail, the adjoining bar sections having opposing coupling flanges bolted together and respectively provided with an offset stay projection and an inset stay seat adapted to interlock, and insulating means.

15. In an insulated rail joint, the rails, separate joint bar sections for each rail, the adjoining bar sections having outstanding vertically disposed coupling flanges bolted together and respectively provided with a horizontally arranged stay projection and stay seat adapted to interlock, and insulating means.

16. In an insulated rail joint, the rails, separate joint bar sections for each rail, the adjoining bar sections having outstanding vertically disposed coupling flanges bolted together and depending below the rail bottoms, said opposing coupling flanges being respectively provided with a stay projection and a stay seat adapted to interlock to provide a brace connection for the coupling flanges, and insulating means.

17. In an insulated rail joint, the rails, separate joint bar sections for each rail, the adjoining bar sections having outstanding vertically disposed coupling flanges provided with an interlocking brace connection therebetween, insulated fastening bolts connecting the said flanges, and an end post insulation interposed between the rail ends and the coupling flanges of the opposite sets of joint bar sections.

18. In an insulated rail joint, the rails, separate joint bar sections for each rail, the adjoining bar sections having opposing vertically disposed coupling flanges, one of said flanges being provided therein with a horizontal, transversely arranged recess forming a stay seat, and the opposing flange being provided with a correspondingly arranged offset tenon having interlocking engagement with said seat, insulated bolts connecting the flanges, and an end post insulation interposed between the rail ends and the coupling flanges of the opposite sets of joint bar sections, said end post insulation having deflected portions fitting the stay seats and the elements interlocking therewith.

19. In an insulated rail joint, the rails, separate joint bar sections for each rail, the adjoining bar sections being provided with opposing coupling flanges having a shouldered interlocking brace connection therebetween, the brace connections for the opposite sets of joint bar sections being arranged in diagonally opposite relation, insulated fastenings for the coupling flanges, and an insulating end post interposed between the rail ends and the opposite sets of coupling flanges and provided with oppositely projecting cupped portions respectively fitting the diagonally opposite brace connections.

20. In an insulated rail joint, the rails, separate joint bar sections for each rail, the adjoining bar sections having opposing vertically disposed coupling flanges respectively provided with an inset stay seat and an offset stay projection interlocking therewith, insulated bolts connecting the flanges, and an insulating end post interposed between the rail ends and the opposite sets of coupling flanges, said end post being vertically split at the bottom and formed with offset cupped portions at opposite sides of the split, said cupped portions projecting in opposite directions and fitting the interlocking stay elements of the opposite sets of coupling flanges.

In testimony whereof we hereunto affix our signatures in the presence of witnesses.

BENJAMIN WOLHAUPTER.
LAWRENCE F. BRAINE.

Witnesses:
PERCY HOLBROOK,
D. P. WOLHAUPTER.